United States Patent
Hayes et al.

(10) Patent No.: US 12,124,429 B2
(45) Date of Patent: *Oct. 22, 2024

(54) WEIGHTED EVENT FOREST

(71) Applicant: United Parcel Service Of America, Inc., Atlanta, GA (US)

(72) Inventors: Eric V. Hayes, Atlanta, GA (US); Waleed Ahmed, Atlanta, GA (US)

(73) Assignee: UNITED PARCEL SERVICE OF AMERICA, INC., Atlanta, GA (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/379,039

(22) Filed: Oct. 11, 2023

(65) Prior Publication Data

US 2024/0037088 A1 Feb. 1, 2024

Related U.S. Application Data

(63) Continuation of application No. 17/090,658, filed on Nov. 5, 2020, now Pat. No. 11,822,534.

(51) Int. Cl.
*G06F 16/23* (2019.01)
*G06F 16/22* (2019.01)
*G06F 16/25* (2019.01)
*G06F 16/28* (2019.01)

(52) U.S. Cl.
CPC ...... *G06F 16/2358* (2019.01); *G06F 16/2246* (2019.01); *G06F 16/2365* (2019.01); *G06F 16/254* (2019.01); *G06F 16/289* (2019.01)

(58) Field of Classification Search
None
See application file for complete search history.

(56) References Cited

U.S. PATENT DOCUMENTS

| | | |
|---|---|---|
| 2006/0178918 A1 | 8/2006 | Mikurak |
| 2006/0265365 A1 | 11/2006 | Chkodrov et al. |
| 2012/0117083 A1* | 5/2012 | Riepshoff ......... G06F 16/24556 707/E17.012 |
| 2021/0133650 A1* | 5/2021 | Cella .................. G06Q 10/0637 |
| 2022/0138174 A1 | 5/2022 | Hayes et al. |

* cited by examiner

*Primary Examiner* — Taelor Kim
(74) *Attorney, Agent, or Firm* — Shook, Hardy & Bacon L.L.P.

(57) ABSTRACT

Embodiments of the present disclosure are directed to specific, networked, and technological processes and operations. For example, various embodiments are directed to a distributed and collaborative planning tool that allows users to create events based on a presently-approved production plan, enable/disable events submitted by other users, submit proposals, approve proposals, and integrate proposals to update the presently-approved production plan. An event published by a first user is communicated to other users using a single, universal framework that tracks and communicates proposed changes between remote users and their associated client devices during the planning cycle without the need to store multiple iterations of full-size production plans.

20 Claims, 8 Drawing Sheets

WEIGHTED EVENT FOREST

CROSS-REFERENCE TO RELATED APPLICATIONS

This application is a continuation of U.S. patent application Ser. No. 17/090,658, filed on Nov. 5, 2020, entitled Weighted Event Forest, the contents of which are incorporated in their entirety herein.

TECHNICAL FIELD

The present disclosure generally relates to operator interfaces and specific networked collaboration applications. In particular, this disclosure relates to user interfaces or collaboration services, such as software tools associated with distributed creation and modification of production plans in complex logistics networks.

BACKGROUND

Typical logistics planning tools allow network planners to brainstorm and simulate changes to a complex system of links, hubs, and centers in order to efficiently meet the needs of the network and customers. For example, if a network planner wanted to determine the viability of same day delivery in a particular metro area, the planner could use electronic spreadsheets or other software tools to game out the impact of adding, modifying, or removing aspects of the logistics network in order to create a packaged proposal. Several such network planners may be simultaneously working on proposals that would affect the same links, hubs, or centers. However, the absence of a flexible networked collaboration and change management system means that when administrators go to accept proposals from network planners, a complicated and time-consuming reconciliation process is required to eliminate or mitigate the impact of one accepted proposal on others, before they enter production.

SUMMARY

Brief Description of the Drawings

Having thus described the disclosure in general terms, reference will now be made to the accompanying drawings, which are not necessarily drawn to scale, and wherein:

DETAILED DESCRIPTION OF THE INVENTION

The present disclosure will now be described more fully hereinafter with reference to the accompanying drawings, in which some, but not all embodiments of the disclosure are shown. Indeed, the disclosure may be embodied in many different forms and should not be construed as limited to the embodiments set forth herein. Rather, these embodiments are provided so that this disclosure will satisfy applicable legal requirements. Like numbers refer to like elements throughout.

I. Overview

As described above, existing technologies silo network planners during the planning phase which results in a complicated and time consuming reconciliation process during the production integration phase of logistic planning cycles. Network plans frequently require changes in response to changes in real-world events, shipping volume forecasts, and the like. In but one specific example, a network plan for May 2020 may be significantly different than a network plan for May 2019 (and network a plan for April 2020) because more people may be likely to utilize particular carrier services to deliver Mother's day gifts during social distancing and pandemic response restrictions. In order to create a network plan for a particular time period, such as May 2020, that is anticipated to be efficiently responsive to customer demand, a plurality of network planners may be used to brainstorm and simulate various events. As used herein, an event may be considered to be any aspect of the logistics network (e.g., a shift at a particular location, a particular conveyance for a transit link, and the like). Each network planner may be assigned discrete or distinct areas of responsibility (e.g., based on the properties of the logistics network, geography, or the like); for example, a first network planner may be assigned central and eastern Kansas and a second network planner may be assigned western Kansas. Network planners may also have overlapping or the same areas of responsibility; for example the first network planner may be responsible for a first set of one or more aspects of Kansas City and the second network planner may be responsible for a second set of one or more aspects of Kansas City, wherein both the first and second set are the same or at least partially different (e.g., the first set comprises hubs but not centers and the second set comprises centers but not hubs). As can be appreciated, a complex network may involve numerous network planners.

Existing tools for network planning include using spreadsheets or other software tools that allow each network planner to independently compile a set of events in order to create a proposal, each of which are independently submitted to administrative network planner charged with approving or disapproving submitted proposals or portions thereof. At the beginning of each new planning cycle, a network planner is provided the most recently approved network production plan and proceeds to make additions, modifications, or deletions thereto, until they have arrived at their proposed production plan. Presently, collaboration during the planning phase, between individual network planner is opportunistic; that is, collaboration during this phase largely relies on the first network planner affirmatively reaching out to the second network planner and discussing a particular event or set of events. In other words, changes to the approved network production plan are generally large (i.e., a compilation of approved proposals from the entire pool of network planners) and infrequent (i.e., they occur after a single reconciliation phase per production cycle, which follows the planning phase). Current tools and networked technological methods do not provide for an efficient process of distributed and collaborative planning that would improve the planning cycle by reducing or eliminating the need for reconciliation and facilitate more incremental and higher frequency changes to a future production plan.

Various embodiments of the present disclosure improve the planning process through the use of specific, networked, and technological processes and operations. For example, various embodiments are directed to a distributed and collaborative planning tool that allows users to create events based on a presently-approved production plan, enable/disable events submitted by other users, submit proposals, approve proposals, and integrating proposals to update the presently-approved production plan. Inasmuch, particular embodiments comprise networked technological methods that improve existing software technologies and technological processes by using a particular framework for tracking and communicating changes to events of a production plan between remote users that existing technologies and processes do not utilize. As described above, when a first network planner is planning a change to a particular event, that change is not communicated to a second network planner until it has been approved as part of a reconciled network production plan, preventing the second user from building on the first user's proposed changes. Some embodiments of the present disclosure improve existing technological processes by tracking an event published by a first user and communicating the event to other users using a single, universal framework. Accordingly, a plurality of users and their respective networked client devices can efficiently and effectively collaborate during the planning cycle.

Various existing technologies that may be suitable for achieving the outcomes of the present disclosure may consume an undesirably high quantity of computing resources, such as processors, databases, servers, memory, or the like. For example, even if a proposed event could be tracked (e.g., track changes mode in a spreadsheet), the change would either be communicated as part of the entire plan (e.g., the entire spreadsheet is exchanged), or a user and their associated client device are burdened to search/find their version of the production plan to find the relevant event and update the event to reflect the proposed change. Some embodiments of the present disclosure comprise systems and computer-executable instructions that track and communicate proposed changes between remote users and their associated client devices during the planning cycle. While the effect is to facilitate increased collaboration between users, embodiment solutions of the present disclosure are necessarily rooted in computer technology because they set forth a particular manner of tracking and communicating specifically-enumerated information between networked client devices, using one or more databases as points of reference. For instance, a proposed change can be associated with a particular event, given a weight, and may be associated with a proposal. Whether during the planning phase or when submitting a proposal, proposed changes can be communicated in a truncated form that does not require the entire modified plan to be communicated and separately stored. By communicating and storing the changes to a production plan and providing a client-facing system for efficiently viewing them, as opposed to entire production plans, significant computational, storage, and communication resources are saved. This can improve processor execution, for example, by reducing the amount of lookup time in memory to locate entries. Specifically, for example, processor fetch, decode, and or execute functions can be improved, such as by decreasing fetch time by reducing the amount of time it has to take an address number associated with an instruction (e.g., an entry) from a program counter stored in memory since records are consolidated. Additionally, record or entry consolidation can reduce storage device (e.g., disk) I/O (e.g., excess physical read/write head movements on non-volatile disk) because consolidated records can be accessed in memory in a single pass or single I/O operation, as opposed to multiple, so requests do not have to repetitively reach out to the storage device to perform read/write operations. This can be important since repetitive I/O operations can eventually wear on components, such as a read/write head increase the likelihood of I/O errors (e.g., the read/write head reads an incorrect sector).

II. Apparatuses, Methods, and Systems

Embodiments of the present disclosure may be implemented in various ways, including as apparatuses that comprise articles of manufacture. An apparatus may include a non-transitory computer-readable storage medium storing applications, programs, program modules, scripts, source code, program code, object code, byte code, compiled code, interpreted code, machine code, executable instructions, and/or the like (also referred to herein as executable instructions, instructions for execution, program code, and/or similar terms used herein interchangeably). Such non-transitory computer-readable storage media include all computer-readable media (including volatile and non-volatile media).

In one embodiment, a non-volatile computer-readable storage medium may include a floppy disk, flexible disk, hard disk, solid-state storage (SSS) (e.g., a solid state drive (SSD), solid state card (SSC), solid state module (SSM)), enterprise flash drive, magnetic tape, or any other non-transitory magnetic medium, and/or the like. A non-volatile computer-readable storage medium may also include a punch card, paper tape, optical mark sheet (or any other physical medium with patterns of holes or other optically recognizable indicia), compact disc read only memory (CD-ROM), compact disc-rewritable (CD-RW), digital versatile disc (DVD), Blu-ray disc (BD), any other non-transitory optical medium, and/or the like. Such a non-volatile computer-readable storage medium may also include read-only memory (ROM), programmable read-only memory (PROM), erasable programmable read-only memory (EPROM), electrically erasable programmable read-only memory (EEPROM), flash memory (e.g., Serial, NAND, NOR, and/or the like), multimedia memory cards (MMC), secure digital (SD) memory cards, SmartMedia cards, CompactFlash (CF) cards, Memory Sticks, and/or the like. Further, a non-volatile computer-readable storage medium may also include conductive-bridging random access memory (CBRAM), phase-change random access memory (PRAM), ferroelectric random-access memory (FeRAM), non-volatile random-access memory (NVRAM), magnetoresistive random-access memory (MRAM), resistive random-access memory (RRAM), Silicon-Oxide-Nitride-Oxide-Silicon memory (SONOS), floating junction gate random access memory (FJG RAM), Millipede memory, racetrack memory, and/or the like.

In one embodiment, a volatile computer-readable storage medium may include random access memory (RAM), dynamic random access memory (DRAM), static random access memory (SRAM), fast page mode dynamic random access memory (FPM DRAM), extended data-out dynamic random access memory (EDO DRAM), synchronous dynamic random access memory (SDRAM), double information/data rate synchronous dynamic random access memory (DDR SDRAM), double information/data rate type two synchronous dynamic random access memory (DDR2 SDRAM), double information/data rate type three synchronous dynamic random access memory (DDR3 SDRAM), Rambus dynamic random access memory (RDRAM), Twin Transistor RAM (TTRAM), Thyristor RAM (T-RAM), Zero-capacitor (Z-RAM), Rambus in-line memory module (RIMM), dual in-line memory module (DIMM), single in-line memory module (SIMM), video random access memory (VRAM), cache memory (including various levels), flash memory, register memory, and/or the like. It will be appreciated that where embodiments are described to use a computer-readable storage medium, other types of computer-readable storage media may be substituted for or used in addition to the computer-readable storage media described above.

As should be appreciated, various embodiments of the present disclosure may also be implemented as methods, apparatus, systems, computing devices/entities, computing entities, and/or the like. As such, embodiments of the present disclosure may take the form of an apparatus, system, computing device, computing entity, and/or the like executing instructions stored on a computer-readable storage medium to perform certain steps or operations. However, embodiments of the present disclosure may also take the form of an entirely hardware embodiment performing certain steps or operations.

Embodiments of the present disclosure are described below with reference to block diagrams and sequence diagram illustrations. Thus, it should be understood that each block of the block diagrams and sequence diagram illustrations may be implemented in the form of a computer program product, an entirely hardware embodiment, a combination of hardware and computer program products, and/or apparatus, systems, computing devices/entities, computing entities, and/or the like carrying out instructions, operations, steps, and similar words used interchangeably (e.g., the executable instructions, instructions for execution, program code, and/or the like) on a computer-readable storage medium for execution. For example, retrieval, loading, and execution of code may be performed sequentially such that one instruction is retrieved, loaded, and executed at a time. In some exemplary embodiments, retrieval, loading, and/or execution may be performed in parallel such that multiple instructions are retrieved, loaded, and/or executed together. Thus, such embodiments can produce specifically-configured machines performing the steps or operations specified in the block diagrams and sequence diagram illustrations. Accordingly, the block diagrams and sequence diagram illustrations support various combinations of embodiments for performing the specified instructions, operations, or steps.

III. Exemplary System Architecture

Figure 1:
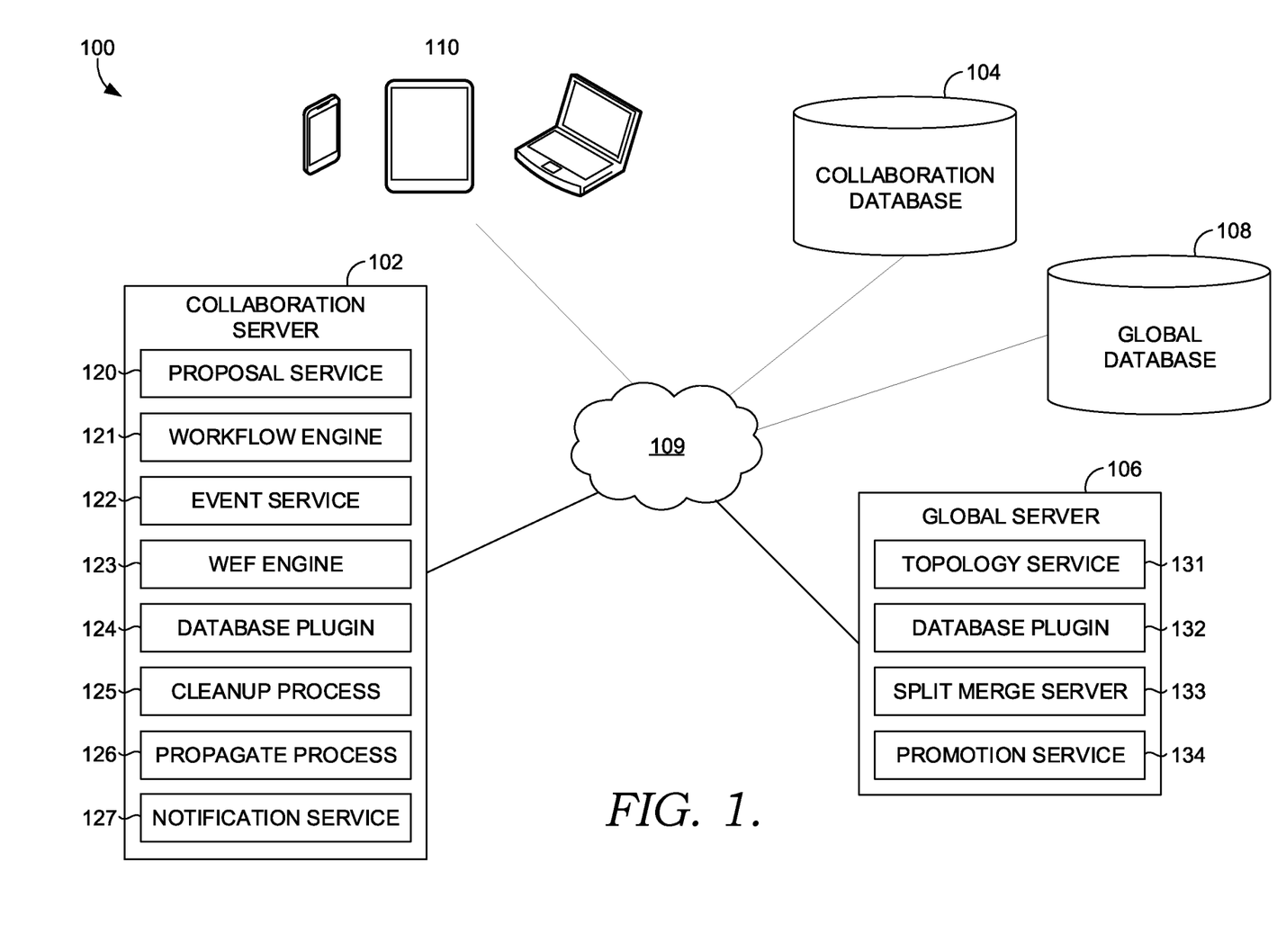
FIG. 1 is a schematic diagram of an example computing environment in which aspects of the present disclosure are employed in, according to some embodiments.

FIG. 1 is a schematic diagram of an example computing environment 100 in which aspects of the present disclosure are employed in, according to some embodiments. As shown in FIG. 1, this particular computing environment 100 includes one or more client devices (i.e., computing entities) 110, one or more computer processing components (e.g., a collaboration server 102 and a global server 106), and one or more storage devices (e.g., a collaboration database 104 and global database 108). Each of these components, entities, devices, systems, and similar words used herein interchangeably may be in direct or indirect communication with, for example, one another over the same or different wired and/or wireless networks, collectively represented by a network 109. Additionally, while FIG. 1 illustrates the various system entities as separate, standalone entities, the various embodiments are not limited to this particular architecture.

As shown in FIG. 1 and described above, the computing environment 100 may comprise one or more computer processing components, such as the collaboration server 102 and the global server 106. The computing environment 100 may have more or fewer computer processing components to accomplish the same objectives as the configuration set forth in FIG. 1. In one aspect, each of the collaboration server 102 and the global server 106 comprise a software stack, hardware components configured to perform particular operations, or combinations thereof, for performing a particular functionality. For example, the collaboration server 102 is shown as comprising a proposal service 120, workflow engine 121, event service 122, weighted event forest (WEF) engine 123, collaboration database plugin 124, a cleanup process 125, propagation process 126, and notification service 127; however, the collaboration server 102 may have more or fewer software and/or hardware components. The global server 106 is shown as comprising a topology service 131, a global database plugin 132, a split merge service 133, and a promotion service 134; however, the collaboration server 102 may have more or fewer software and/or hardware components. Though shown as a single computer processing component, each of the collaboration server 102 and the global server 106 may be divided into a plurality of discrete processing components, any one of which may comprise software or hardware components such as those described with respect to FIG. 1.

Figure 2:
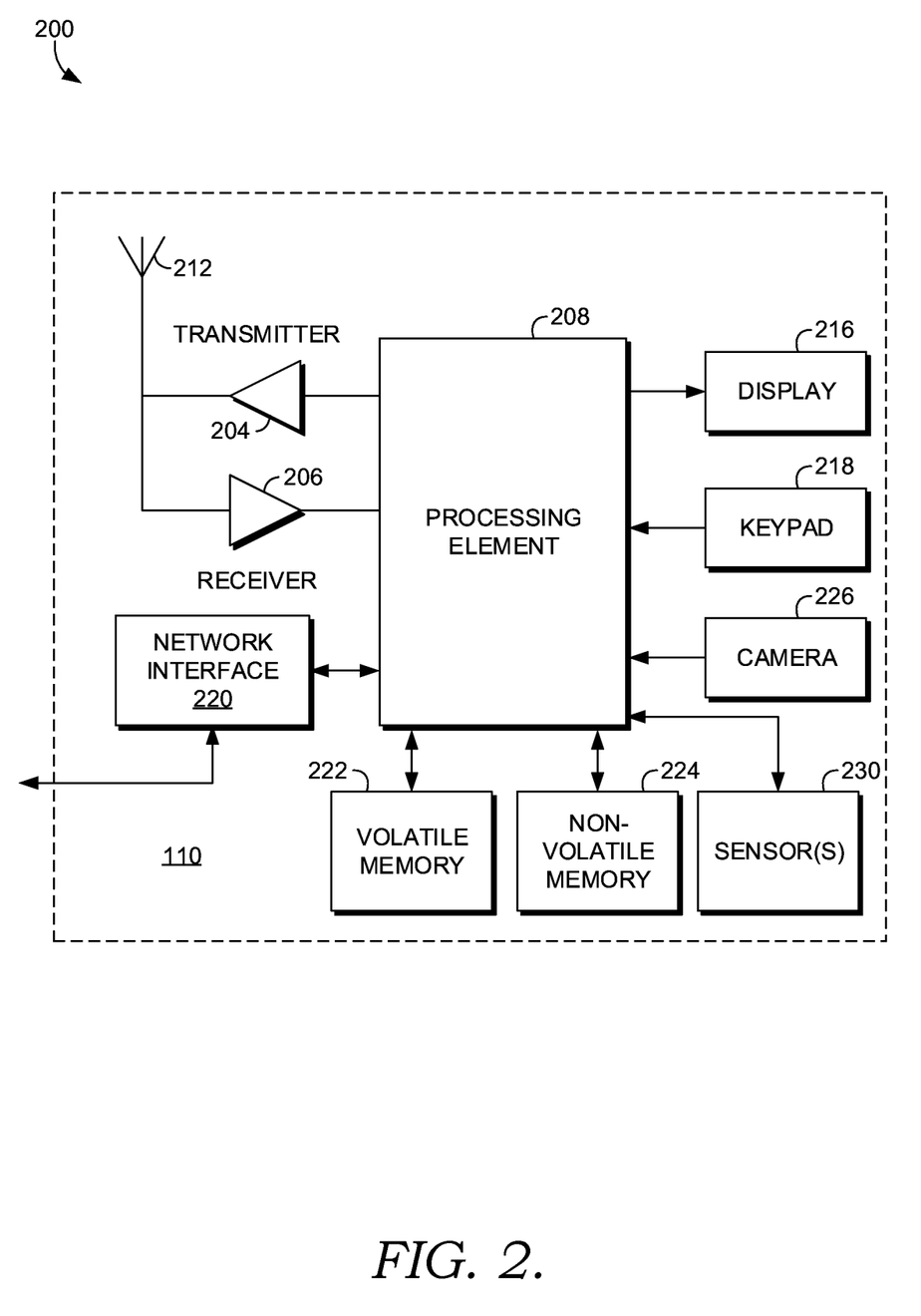
FIG. 2 is a schematic diagram of a computing entity in which aspects of the present disclosure are employed in, according to some embodiments.

FIG. 2 provides a schematic of a computing entity 200 suitable for particular embodiments of the present disclosure. In general, the terms computing entity, computer, entity, device, system, and/or similar words used herein interchangeably may refer to, for example, one or more computers, computing entities, desktops, mobile phones, tablets, phablets, notebooks, laptops, distributed systems, consoles input terminals, servers or server networks, blades, gateways, switches, processing devices, processing entities, set-top boxes, relays, routers, network access points, base stations, the like, and/or any combination of devices or entities adapted to perform the functions, operations, and/or processes described herein. Such functions, operations, and/or processes may include, for example, transmitting, receiving, operating on, processing, displaying, storing, determining, creating/generating, monitoring, evaluating, comparing, and/or similar terms used herein interchangeably. In particular embodiments, these functions, operations, and/or processes can be performed on data, content, information/data, and/or similar terms used herein interchangeably.

In general, the terms device, system, computing entity, entity, and/or similar words used herein interchangeably may refer to, for example, one or more computers, computing entities, desktops, mobile phones, tablets, phablets, notebooks, laptops, distributed systems, vehicle multimedia systems, autonomous vehicle onboard control systems, watches, glasses, key fobs, radio frequency identification (RFID) tags, ear pieces, scanners, imaging devices/cameras (e.g., part of a multi-view image capture system), wristbands, kiosks, input terminals, servers or server networks, blades, gateways, switches, processing devices, processing entities, set-top boxes, relays, routers, network access points, base stations, the like, and/or any combination of devices or entities adapted to perform the functions, operations, and/or processes described herein. For example, any one or more components of the computing entity 200 may comprise any one or more components of computing environment 100. For example, at least a portion of computing entity 200 may be a client device, such as client device 110 in FIG. 1. At least a portion of computing entity 200 may be server, such as the collaboration server 102 or the global server 106, or it may be a more granular component, such as a hardware component configured to operate the proposal service 120 of FIG. 1.

As indicated in FIG. 2, in particular embodiments, the computing entity 200 may include one or more communication interfaces 220 for communicating with various computing entities, such as by communicating data, content, information/data, and/or similar terms used herein interchangeably that can be transmitted, received, operated on, processed, displayed, stored, and/or the like. The computing entity 200 may include an air interface that comprises one or more of an antenna 212, a transmitter 204 (e.g., radio), a receiver 206 (e.g., radio), and a processing element 208 (e.g., CPLDs, microprocessors, multi-core processors, coprocessing entities, ASIPs, microcontrollers, and/or controllers) that provides signals to and receives signals from the transmitter 204 and receiver 206, respectively. The air interface may operate in accordance with multiple wireless communication standards and protocols, such as UMTS, CDMA2000, 1×RTT, WCDMA, TD-SCDMA, LTE, E-UTRAN, EVDO, HSPA, HSDPA, Wi-Fi, Wi-Fi Direct, WiMAX, UWB, IR, NFC, Bluetooth, USB, and/or the like. In some embodiments, the computing entity 110 includes one or more sensors 330. Using one or more of the network interface 220 or the air interface, the computing entity 200 may be configured to interface with one or more other devices, components, or the network 109, of computer environment 100 of FIG. 1.

The computing entity 200 may also comprise a user interface (that can include a display 316 coupled to a processing element 208) and/or a user input interface (coupled to a processing element 208). For example, the user interface may be a user application, browser, user interface, and/or similar words used herein interchangeably executing on and/or accessible via the computing entity 200 to interact with and/or cause display of information from the logistics server(s) 105, as described herein. The user input interface can comprise any of a number of devices or interfaces allowing the computing entity 200 to receive information/data, such as a keypad 218 (hard or soft), a touch display, voice/speech or motion interfaces, or other input device. In embodiments including a keypad 218, the keypad 218 can include (or cause display of) the conventional numeric (0-9) and related keys (#, *), and other keys used for operating the computing entity 110 and may include a full set of alphabetic keys or set of keys that may be activated to provide a full set of alphanumeric keys. In addition to providing input, the user input interface can be used, for example, to activate or deactivate certain functions, such as screen savers and/or sleep modes. The computing entity 200 may also include an camera, imaging device, and/or similar words used herein interchangeably 226 (e.g., still-image camera, video camera) configured to capture images. The computing entity 200 may be configured to capture images via the onboard camera 226, and to store those imaging devices/cameras locally, such as in the volatile memory 222 and/or non-volatile memory 224. As discussed herein, the computing entity 200 may be further configured to match the captured image data with relevant network data. For example, the camera 226 may be used to capture an image of a visually-perceptile indicia, such as a QR code, 2D barcode, or the like, wherein the visually-perceptible indicia is a unique identifier that is associated with a particular object (e.g., a hub, center, link, conveyance, shift, or the like) which provide the basis for creating, modifying, or removing an proposed event, as discussed in greater detail herein.

The computing entity 110 can also include volatile storage or memory 322 and/or non-volatile storage or memory 324, which can be embedded and/or may be removable. For example, the non-volatile memory may be ROM, PROM, EPROM, EEPROM, flash memory, MMCs, SD memory cards, Memory Sticks, CBRAM, PRAM, FeRAM, NVRAM, MRAM, RRAM, SONOS, FJG RAM, Millipede memory, racetrack memory, and/or the like. The volatile memory may be RAM, DRAM, SRAM, FPM DRAM, EDO DRAM, SDRAM, DDR SDRAM, DDR2 SDRAM, DDR3 SDRAM, RDRAM, TTRAM, T-RAM, Z-RAM, RIMM, DIMM, SIMM, VRAM, cache memory, register memory, and/or the like. The volatile and non-volatile storage or memory can store databases, database instances, database management systems, information/data, applications, programs, program modules, scripts, source code, object code, byte code, compiled code, interpreted code, machine code, executable instructions, and/or the like to implement the functions of the computing entity 110. As indicated, this may include a user application that is resident on the entity or accessible through a browser or other user interface for communicating with the logistics server(s) 105 and/or various other computing entities.

IV. Exemplary System Operation

As discussed above, complex planning cycles may often involve numerous planners, whose respective plans impact one another. A particular plan proposal may be broken down in to one or more sets of changes that achieve a particular end. For example, in the logistics context, a proposal may comprise one or more events, wherein each event achieves some result (e.g., creating a new service route, accommodating increased sort volume, and the like) and wherein each event comprises one or more business objects (e.g., twilight shift working or not working at a particular SLIC, during a particular time period). One can appreciate that many contexts exists that can be similarly structured; for example, military planning (e.g., a proposal may comprise multiple lower-order maneuvers (events) that require individual units (business objects) to perform a particular function), business planning (e.g., a proposal may comprise performing certain operations (events) that require individual machines or labor segments (business objects) to perform a particular function. Further, as discussed above, conventional methods of collaboration in complex planning environments may require storing and transmitting large amounts of data between users and, if infrequently approved, may require extensive reconciliation in order to integrate a new plan.

Embodiments of the present invention are based on a particular framework of tracking and communicating events between users of a distributed network. As a baseline, the entity (e.g., logistics company) may be said to have a plan (e.g., a production plan) that is in effect at a particular time. That plan may be communicated to a plurality of distributed users as a basis for making changes and suggesting a particular plan for a future time period. Embodiments of the present invention allow users to create an event that would be a change to the baseline network production plan. Each event may comprise changes to one or more business objects and each event is associated with a weighted event tree (WET). A WET may be best defined as a data framework for succinctly tracking changes to the network production plan and may comprise one or more events, which themselves may comprise changes to one or more business objects. That is, all events that affect exactly one object, whether enabled or disabled, will be sequentially listed in a single WET, and each event can exist in only one WET, wherein each event is associated with a pointer to its WET. Each WET may comprise a list of the active/enabled event(s) at any particular point in time or for any particular time range. Each event may be associated with one or maps, the one or maps comprising a construct map ("datChnAryTe"), a destruct map ("weightedDestructsKeyAryTe"), and a tree construct map ("treeConstructsMap"). The construct map generally relates to a listing of all changes to the attributes of an updated record; for example, take a base production document featured only that "1DA" had values of "x=1" and "y=2," changing the "x" value of "1DA" would result in a construct map that indicated an "update" to "1DA." Other potential options for status indicators in the construct map may comprise remove, add, disable, and enable. The destruct map generally relates to a listing of all attributes and their changed values that are affected by an event; for example, the destruct map may take the form of "{"1DA": {"x": "5"}}, such that the destruct map comprises the actual updated value (or a new value or a "null" value if being removed, for example). Because each WET is in a one-one correspondence with a change log record, the construct, destruct, and tree construct map ensures that the WET is always in sync with the change log record and reflects the most up to date values of one or more attributes associated with any one or more events associated with an object.

The WET may include additional information, such as a user identity, modeling information, a community identity, identifying information for the network production plan, and the like. Instead of saving an entire new, revised plan comprising changes captured in events, the present invention uses the WET framework to determine which relevant portions of the plan have been affected, and saves enough information to track the changes in order that they may be communicated with collaborative users. For example, consider that a particular users wants to see the effects of a particular event; the user may create an event that deletes a first object attribute, adds a second object attribute, and modifies a third object attribute. The present invention would construct a WET that comprises a changelog, wherein the changelog comprises the baseline values of the object attributes changed by the event and the event's changes. In other words, instead of communicating an entire revised plan comprising the new event to other user, only the WET would be stored on a server, such as the collaboration server 104 of FIG. 1, and communicated to collaborative users.

Figure 3:
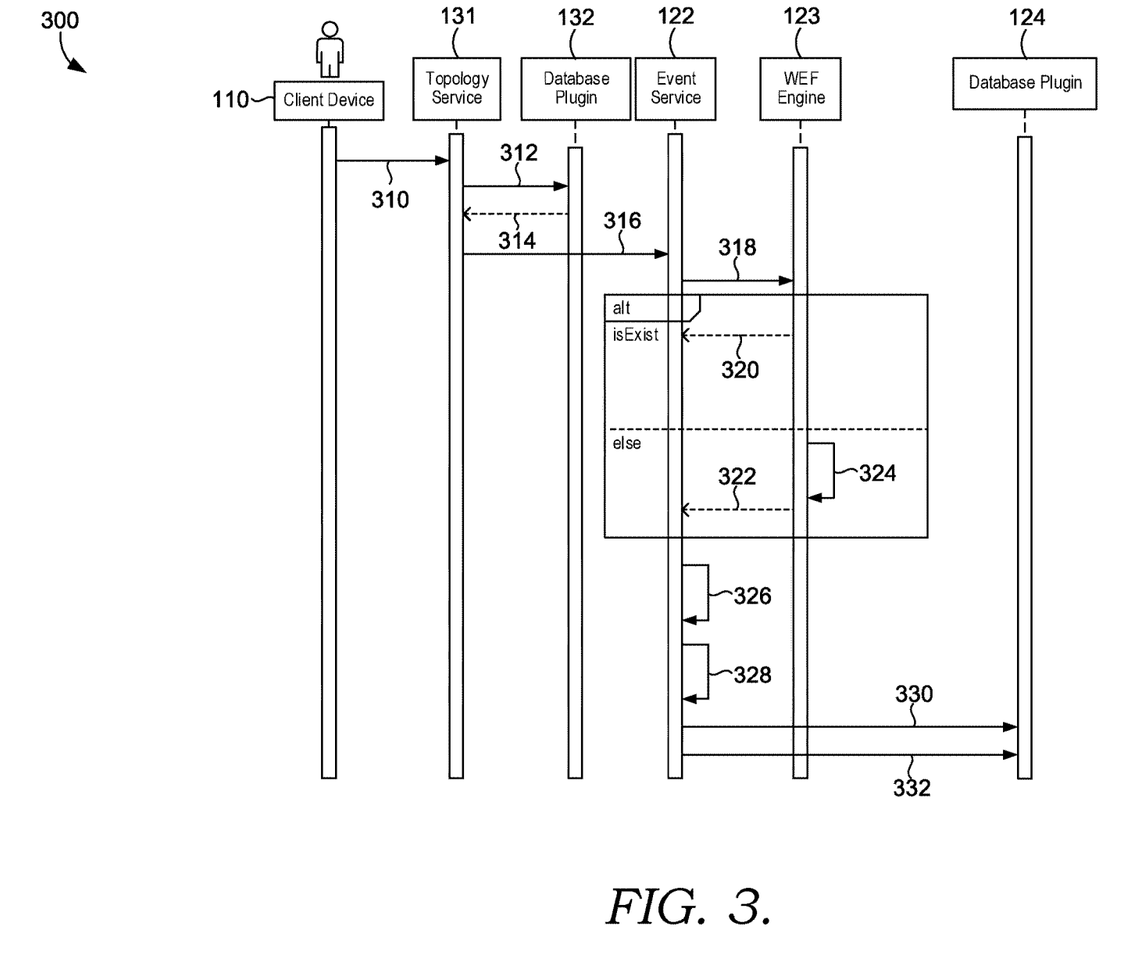
FIG. 3 shows a sequence diagram illustrating operations and processes that can be used for creating events in accordance with various embodiments of the present invention.

Turning now to FIG. 3, a sequence diagram is provided for an event creation process 300 according to the framework of the present disclosure. At step 310, the client device 110 provides an indication to the topology service 131 that the user associated with the client device 110 wishes to create an event. Said indication may be based on receiving an indication that the user has entered into a plan modification mode or has already made a potential change to the network production plan. At step 312, the topology service 131 communicates information relevant to event creation to the global database plugin 132; said information may comprise a request to modify a particular network production. In response, at step 314, the global database plugin 132 may respond with a copy of the relevant production plan or a production plan identifier that can be used by a different component (e.g., the client device 110) to retrieve the relevant production plan. At step 316, the topology service 131 may communicate various information in a "createEvent" message to the event service 122. The createEvent message may comprise the relevant production record, a changelog record, and a change map. The even service 122 will query the weighted event forest (WEF) engine 123 at step 318 to determine if a relevant WET exists. If a WET does exist (e.g., if some other event was created prior that updates the same production record and the current event being created is an update of the old, other event), the WEF engine 123 returns the relevant WET to the event service 122 at step 320. If a WET does not exist, the WEF engine 123 creates a WET using the changelog record and at step 322, it will communicate the new WET to the event service 122. At steps 326 and 328, the Event service 122 updates the relevant WET and relevant event, based on the created event. At steps 330 and 332, the new or updated WET and the newly created event will be communicated to the collaborative database plugin 124, wherein said communication comprises the changelog record of the newly created record, the list of events, and the active events.

Figure 4:
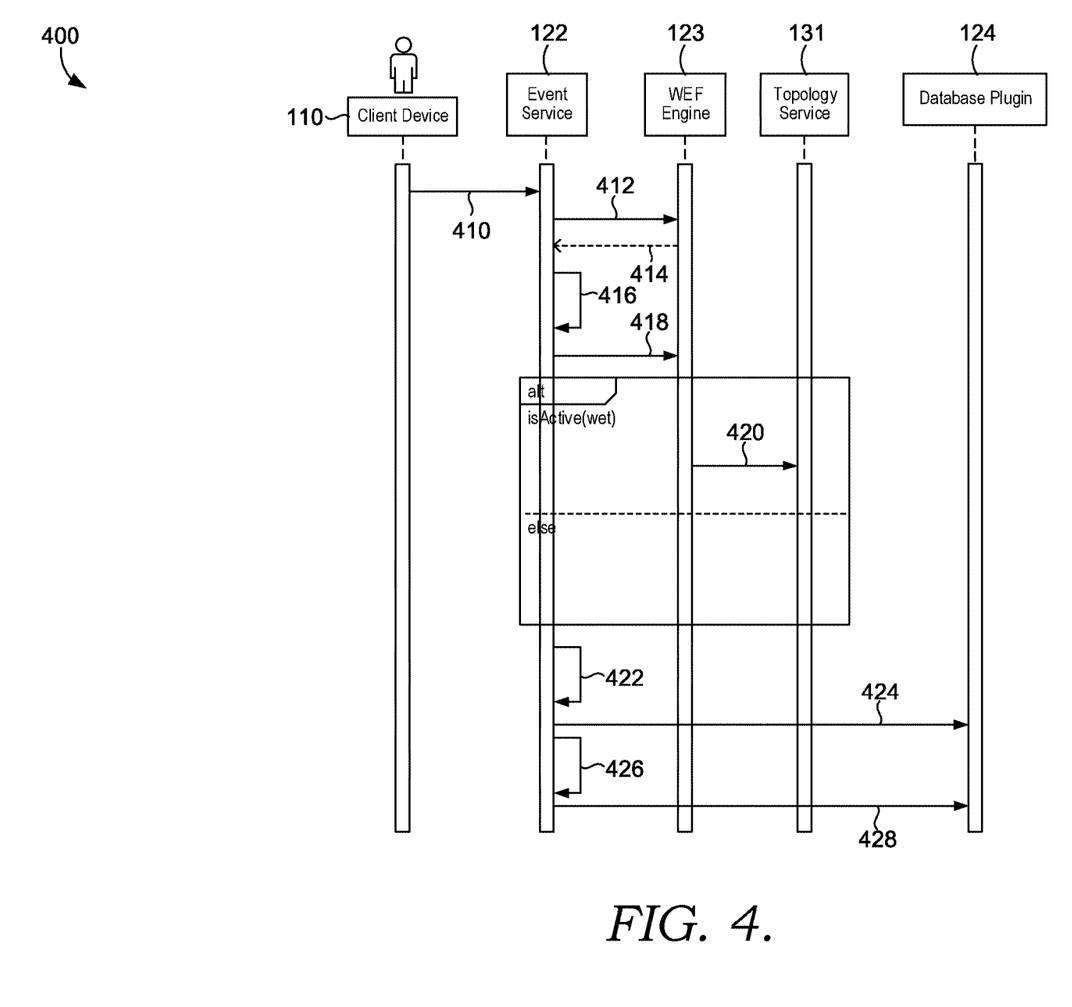
FIG. 4 shows a sequence diagram illustrating operations and processes that can be used for disabling events in accordance with various embodiments of the present invention.

Turning now to FIG. 4, a sequence diagram is provided for a disable event process 400, according to the framework of the present disclosure. The process 400 begins when a user utilizes the client device 110 to disable a particular event published by another, non-administrative user. At step 410, the client device 110 communicates an event number associated with the particular event to the event service 122. At step 412, the event service 122 communicates a request to the WEF engine 123 for the WET associated with the event number. In response, at step 414, the WEF engine 123 returns the WET to the event service 122. At step 416 the particular event is removed from the active event list of the WET. At step 420, if there are no more active events indicated in the active event list of the WET a call will be done to the topology service 131 with the WETs change log to delete the corresponding change log record as there's no active changes to it. If there's at least on active event in the active event list, this means that there's an active change to the modeled record. At step 422, the event service 122 updates the WET to compute the update change attributes map. At step 424, the corresponding WET is updated in the collaboration server as a result of a communication from the event service 122 to the collaboration database plugin 124. At step 426, the event service updates the event based on the WET's change log, and the change attributes map. At step 428, the event is saved as a result of a communication from the event service 122 to the collaboration database plugin 124.

Figure 5:
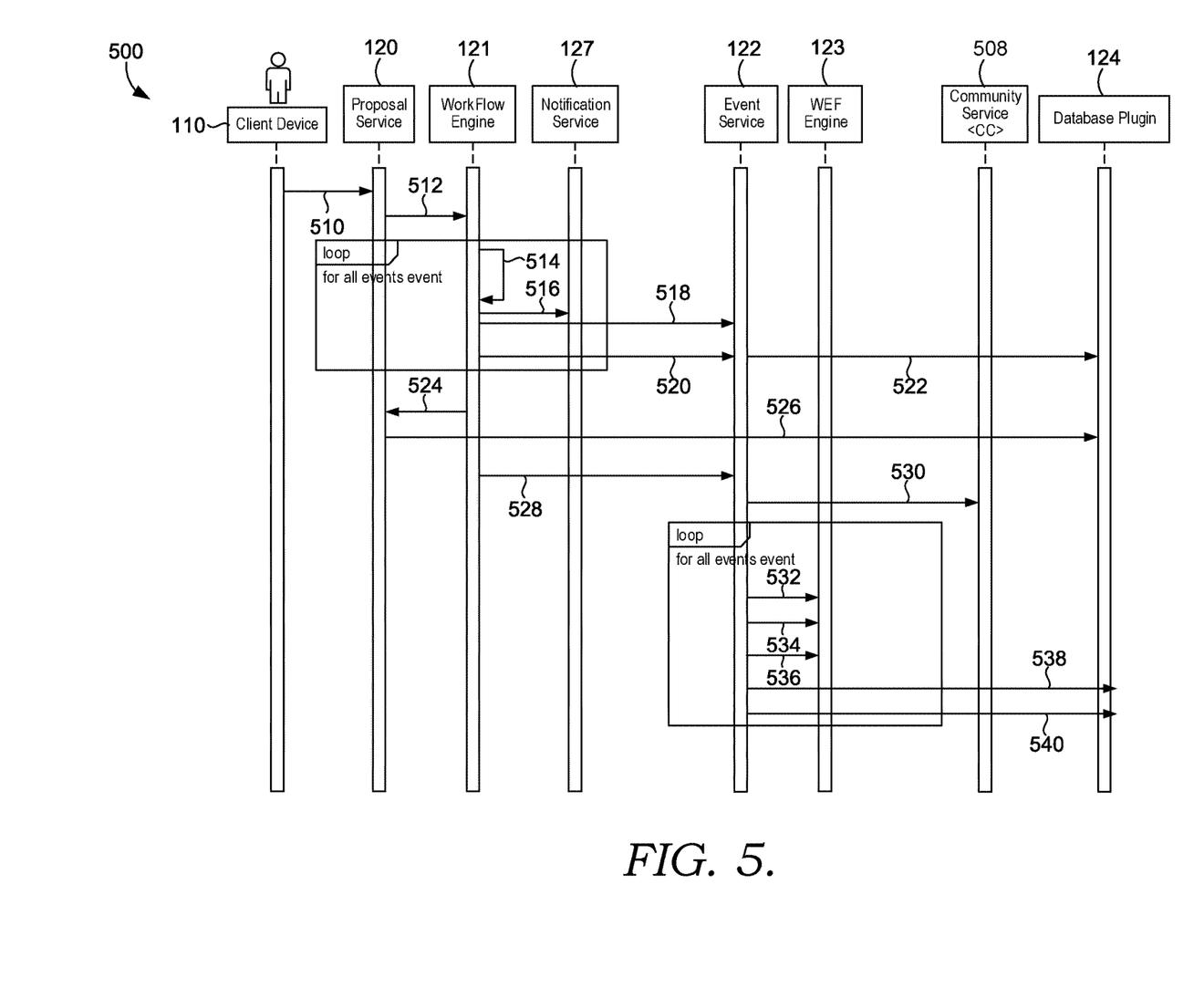
FIG. 5 shows a sequence diagram illustrating operations and processes that can be used for submitting proposals in accordance with various embodiments of the present invention.

Turning now to FIG. 5, a sequence diagram is provided for a proposal submission process 500, according to the framework of the present disclosure. At step 510, a proposal comprising one or more events associated with one or more WETs and having one or more change logs is communicated from the client device 110 to the proposal service 120 wherein the submitted proposal is assigned a proposal number. At step 512, the proposal is forwarded from the proposal service 120 to the workflow engine 121 which performs a looped process comprising steps 514-520 that delegates the submitted events to the relevant administrative user (i.e., approver). At step 514, the workflow engine 121 selects the appropriate approver for each particular event, and notifies the appropriate approval via the notification service 127 at step 516. At step 518, if the event is approved, the workflow engine 121 will call to set the proposal number in the event's submitted Proposal Number. A step 520, the workflow engine 121 will communicate the updated event to the event service 122 and at step 522 the event service 122 will updated the even with the collaboration database plugin 124. At step 524, any updates to the proposal are communicated from the workflow engine 121 to the proposal service 120 and then at step 526 from the proposal service to the collaboration database plugin. At step 528, a call will be done to the event service 122 to merge proposal events to all community users and communicated to the community users at step 530. The process may comprise a merging loop comprising step 532-540 may be performed wherein at step 532, the approved event is cloned and communicated from the event service 122 to the WEF engine 123 as well as the cloned WET at step 534. Each event in the proposal will be cloned to all community users as disabled. All WETs corresponding to events in the proposal will be cloned with a −1 value for change log system number as the WET is inactive. In aspects, when the event is cloned, the cloned event's user ID is changed to be the community user's ID, and so is the WET ID. At steps 528 and 540 the event service 122 stores the event and the WET via communications with the collaboration database plugin 124.

Figure 6:
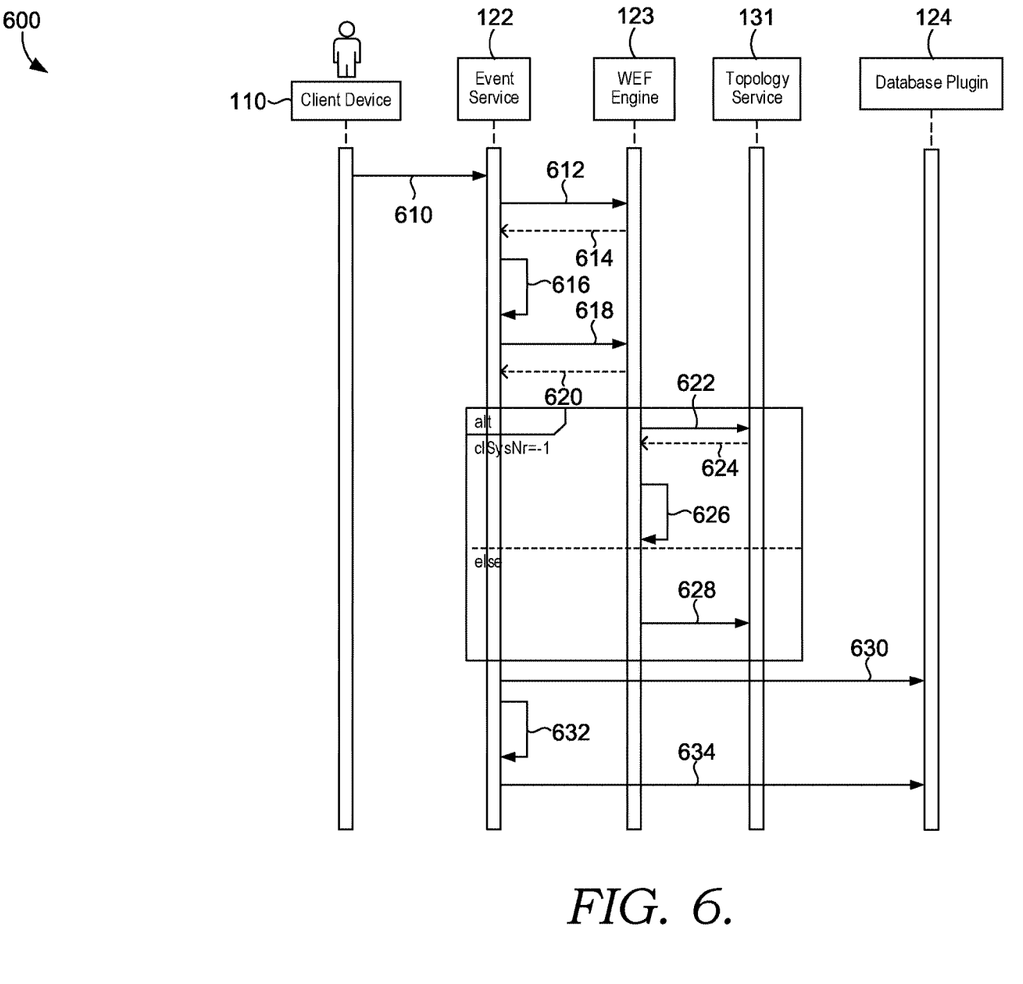
FIG. 6 shows a sequence diagram illustrating operations and processes that can be used for enabling events in accordance with various embodiments of the present invention.

Turning now to FIG. 6, a sequence diagram is provided for an event enabling process 600, according to the framework of the present disclosure. At step 610 the client device communicates an indication to the event service 122 associated with enabling a particular event. At step 612, the event service 122 requests the WET associated with the particular event based on the event number from the WEF engine 123 and the WEF engine 123 returns the appropriate WET at step 614. At step 616-620, the event service obtains the change log system number of the corresponding WET and communicates with the WEF engine to determine if the event is a cloned event. If it is determined that the event is cloned, a change log is created based on communications between the WEF engine 123 and the topology service 131 and the WET is updated at step 626. If it is determined that the event is not cloned, the changelog is checked for active events and updated at step 628. At step 630 the WET is saved, and steps 632 and 634 update and save the event, respectively.

Figure 7:
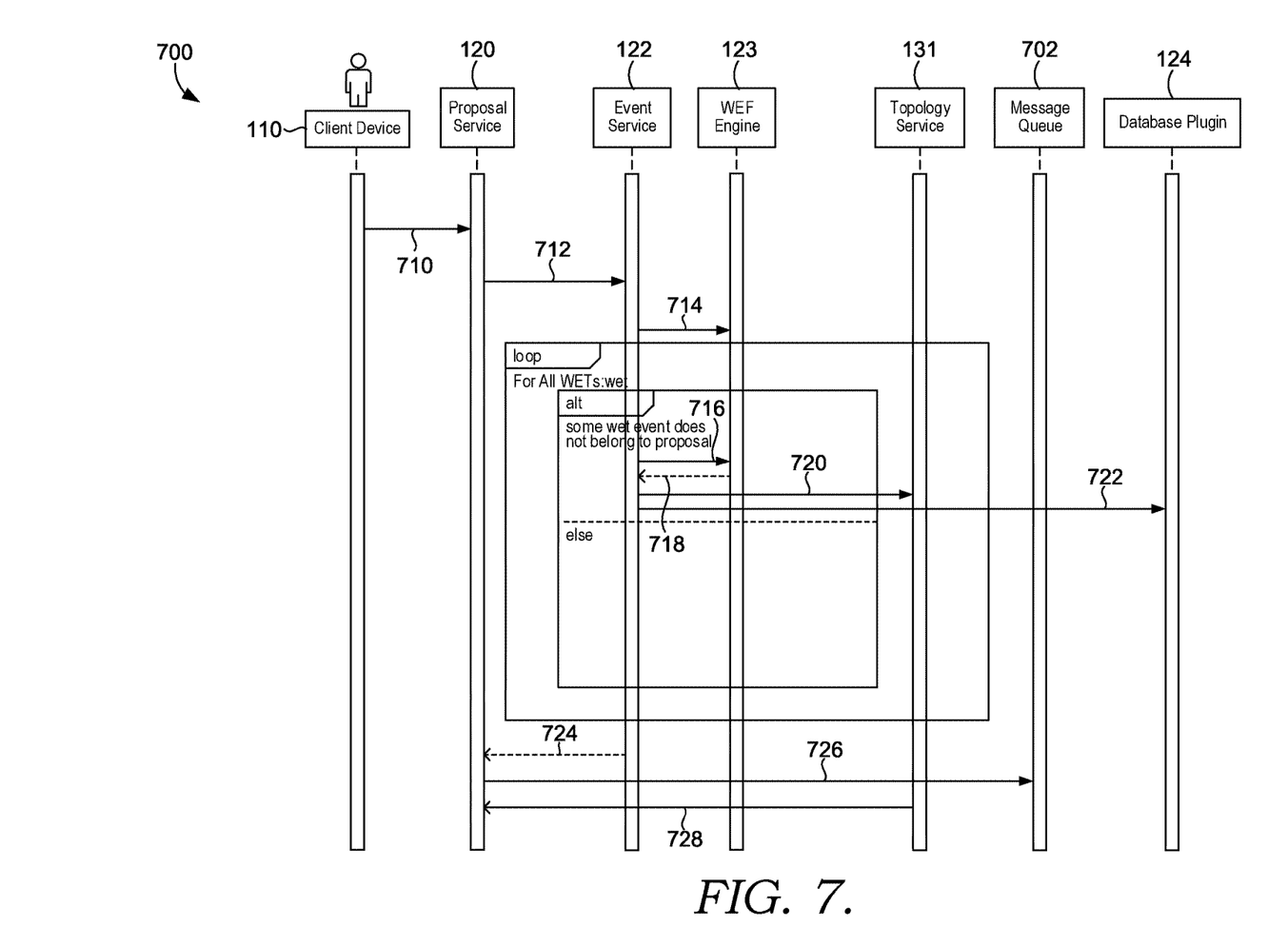
FIG. 7 shows a sequence diagram illustrating operations and processes that can be used for approving proposals in accordance with various embodiments of the present invention.

Turning now to FIG. 7, a sequence diagram is provided for a proposal approval process 700, according to the framework of the present disclosure. At step 710, an indication is communicated from a client device 110 to the proposal service 120. At step 712, the proposal service communicates a list of WETs that are associated with the approved proposal to the event service 122 and the event service 122 then obtains the relevant WETs from the WEF engine at step 714. Steps 716-722 represent a WET adjustment loop wherein at step 716, a background operation will run to check for all events in the WETs that do not belong to the proposal, and clone them at step 718. At step 720, a change log is created for the cloned events and the WETs associated with the cloned events are stored at step 722. Once an indication is received at 724 that the cloning process is complete, a proposal approval message is sent at step 726 from the proposal service 120 to the message queue 702 and any records affected by the approved proposal are promoted and integrated into an updated network production plan at step 728.

An exemplary proposal approval process consistent with the present disclosure is now presented; though comprising any one or more features of the present disclosure, the following should not be construed as comprising necessary elements or steps, nor limiting with respect to any potential solution consistent with the present disclosure. A user may have a list of events in their scratch pad, wherein the list of events comprises E1, E2, E3, E4, E5, and E6. Each event is shown in the below table with a corresponding WET.

| User events | WETs | ChangeLogSysNr |
| --- | --- | --- |
| E1 | T1 | 1 |
| E2 | T2 | 2 |
| E3 | T3 | 3 |
| E4 | T1 | 1 |
| E5 | T4 | 4 |
| E6 | T5 | 5 |

With "B" is a base production record, WET T1 may comprise E1, an update to B, and E4, which is an update to E1. Accordingly, WET T1, changeLogSysNr 1 may comprise B, E1, and E4. Event E1 may comprise changes to variables "X" and "Y," wherein X is changed to value 100 and Y to 200, and event E2 subsequently changes X to 1000. A user may create a first proposal P1 comprising E1, E2, and E3, and a second proposal P2 comprising E5 and E6, E4 may be unassigned to a proposal. When proposal P1 gets approved in the proposal service, a call to event service may be done which would redirect the call to the WEF Engine to adjust all WETs in the proposal. All events in the proposal would be checked out, because there may have been some split that happened on the backend and the events in the proposal are not valid anymore. A check may be done for every event to check the splitEventsList attribute in the event. If this list is empty this means that the event should be dealt with as is, if on the other hand, the list contains some event numbers (eventNrs), these eventNrs will be used instead of the main event.

A background operation, referred to herein as adjustPropoasalWETs, may run to check for all events in the WETs that do not belong to the proposal, in the present example, event E4 belongs to WET T1 and does not belong to P1, so T1 will be cloned to T1* which may be structured, for example, as seen below:

|  | WETs | changeLogSysNrs |
| --- | --- | --- |
| P1 | T1* | 6 |
|  | T2 | 2 |
|  | T3 | 3 |

In aspects, once every wet that is adjusted to the events belonging to the proposal only, the topology service will be called to create a corresponding change log record. If there is already a change log record for the same user and/or the same community in the topology service change log table, a new record may be created with a unique identifier; for example, concatenating the userID to the word "WEF" or any other desirable identifier, as seen below:

| sysNr | mdlNr | userNr | Changes |
|---|---|---|---|
| 1 | c1 | waleed | X = 1000, Y = 200 |
| 6 | c1 | waleed:WEF | X = 100, Y = 200 |

When the adjustProposalWETs process concludes a message may be sent to the AMQ topic stating that an approval proposal merge process has been done for proposal P1. When GIDM topology service AMQ listener gets the message, a call will be done to the proposal service to execute a promotion preparation process referred to herein as getAllSysNrsToPromote. An output may be returned, from the API, for example, referred to herein as changeLogRecrdSysNrsList which indicates which numbers of records have been adjusted, such as the form seen below:

```
changeLogRecrdSysNrsList:    [    {
                                     boName      :"TL",
                                     sysNr       :"6",
                                     adjusted    :True
                                 },
                                 {
                                     boName      :"TLO",
                                     sysNr       :"2",
                                     adjusted    :False
                                 }
                                 {
                                     boName      :"TL",
                                     sysNr       :"3",
                                     adjusted    :False
                                 }
                             ]
```

In aspects, once the GIDM receives the changeLogRecrdSysNrsList, a promotion process may begin. A promotion process may start looping inside every item and a check may be done to see if the "adjusted" value is false. If it is false, the corresponding changeLogSysNr may be updated to production status; conversely, if true, the relevant record may be retrieved and the "P1" may have the userID and mplStsCd stripped off and changed to production.

Once one or more proposals have been approved, the subject matter described herein may further perform a promotion to production process. In aspects, a promotion to production process may have many triggers; for example, it may be called based upon a proposal approval for network planning tool data (NPT) (e.g., sort calendar), a reconciliation admin screen based on a corporate or administrative decision for non-NPT data (e.g., transit links), or from scheduled jobs. When the process runs a call to the GIDM promotion manager, a check may be run in order to determine if a split process or merge process is required. In the below example, a prodrecordsysNr 123 may have attributes wherein X=1, Y=1, and Z=1 and relevantly check the effective start date ("effStsDt") and the effective end date ("effEndDt") of a particular event:

| Event | User | Base | changed Dates effStsDt-effEndDt | Changes |
|---|---|---|---|---|
| E1 | user1 | 123 | Jul. 1, 2019-Oct. 31, 2019 | (Z = 100) |
| E2 | user2 | 123 | dateC-dateD | (Y = 100) |

| WET | User | Base | change log sysNr |
|---|---|---|---|
| wet1 | user1 | 123 | 1234 |
| wet2 | user2 | 123 | 1235 |

Because the effective dates span two different production time periods (e.g., if the production time period is a quarter that runs from July 1 to September 30) event E1 would need to be split into two distinct production records (e.g., production records 133 and 143), as seen below:

| ProdRec | 123 | end Dated | (X = 1000) |
|---|---|---|---|
| | 133 | Jun. 1, 2019-Sep. 30, 2019 | |
| | 143 | date2-date3 | |

When the production manager concludes, a call may be done to the event service to perform the promotion, which in turn may redirect the call to the WEF engine that contains a request object that requests date, record, and change information, such as seen below:

```
[
Topology Type                     : TL,
Original Prod record sys Nr       : 123,
changeLogAssociatedList:[
                                  "1231", "1232"
]
prodSplitList: [{
        new Prod Record Sys Nr    : 133
        start Date                : 06-01-2019,
        end Date                  : 09-30-2019,
        changed attributes        [
                                  <Deltas>
        ]
},
{
        new Prod Record Sys Nr    : 143
        start Date                : 10/01/2019,
        end Date                  : 12/31/9999,
        changed attributes        [
                                  <Deltas>
        ]
}
],
```

When the WEF engine receives the request object, any one or more processes may be triggered, based on the input. For example, a split process, propagation process, or a cleanup process may be performed. A split process and a propagation process may happen together; for example, if base record 123 is in the input, together with changeLogsysNrs 1231, and 1232 will be used to search for all WET objects that depend on that base and may return information pertaining to the relevant WET objects and events, such as seen below:

| Event | User | Base | effStsDt-effEndDt | Changes |
|---|---|---|---|---|
| E1 | user1 | 123 | Jul. 1, 2019-Oct. 31, 2019 | (Z = 100) |
| E2 | user2 | 123 | dateC-dateD | (Y = 100) |

| WET | User | Base | change log sysNr | Data |
|---|---|---|---|---|
| wet1 | user1 | 123 | 1231 | (X = 1, Y = 1, Z = 100) |
| wet2 | user2 | 123 | 1232 | (X = 1, Y = 100, Z = 1) |

A check may be done on the start and end dates of each event; for example, if dateA-dateB for E1 (belonging to user1) lies in the date1-date2 range, then the WET that corresponds to changelog record with sysNr 1334 will be updated to point to the correct change log record. Such an output result may be seen below:

| Event | User | Base | effStsDt-effEndDt | Changes |
|---|---|---|---|---|
| E1 | user1 | 133 | dateA-dateB | (Z = 100) |

| WET | User | Base | change log sysNr | Data |
|---|---|---|---|---|
| wet1 | user1 | 133 | 1334 | (X = 1000, Y = 1, Z = 100) |

In another aspect, if dateA-dateB crosses date1-date2 and extends into date2-date3, then a split may occur on event E1, which may output result such as the one seen below:

| Event | User | Base | effStsDt-effEndDt | Changes |
|---|---|---|---|---|
| E11 | user1 | 133 | Jul. 1, 2019-Sep. 20, 2019 | (Z = 100) |
| E12 | user1 | 143 | Oct. 1, 2019-Oct. 31, 2019 | (Z = 100) |

When a split process is performed on a particular event, a call may be done to the GIDM topology service to create a record (e.g., a change log record). Such a record may comprise the event's attributes that have been changed, the userID associated with the event, and the communityID associated with the event. The topology service may return the record (e.g., a change log system number ("clSysNr")) when it is created (e.g., clSysNr 1334 for user1 and clSysNr 1434 for user2), such as seen below:

| WET | User | Base | clSysNr | Data |
|---|---|---|---|---|
| wet11 | user1 | 133 | 1334 | (X = 1000, Y = 1, Z = 100) |
| wet12 | user1 | 143 | 1434 | (X = 1000, Y = 1, Z = 100) |

In aspect, when a split occurs, a notification will be made to one or more community users (e.g., in response to a call to the notification service) stating that the details from event E1 have been split into events E11 and E12.

When the propagation process occurs for event E1 in WET1, for example, a cleanup process may start to obtain all events that were cloned from event E1 to all community users. The cloned events may be returned by querying event information for the masterProposal and/or the masterEvent. One or more of the cloned events (e.g., all of the cloned events) will be recycled, and the promotion process may conclude. A search for WET1 and WET2 may yield results such as those seen below:

| Event | User | Base | effStsDt-effEndDt | Changes |
|---|---|---|---|---|
| E1 | user1 | 123 | Jul. 1, 2019-Oct. 31, 2019 | (Z = 100) |
| E2 | user2 | 123 | dateC-dateD | (Y = 100) |
| E3 | user1 | 123 | | (Y = 200, Z = 300) |

| WET | User | Base | clSysNr | Data |
|---|---|---|---|---|
| wet1 | user1 | 123 | 1231 | (X = 1, Y = 200, Z = 100) |
| wet2 | user2 | 123 | 1232 | (X = 1, Y = 100, Z = 1) |

As seen above, user1 has created two different events (E1 and E3) that affect the same base production record but have different changes. Because of this, each event in the WET cannot be considered separately and so a grouped event may be created to compile all of the changes in order, such as seen below:

| Event | User | Base | effStsDt-effEndDt | Changes |
|---|---|---|---|---|
| E13g | user1 | 123 | Jul. 1, 2019-Oct. 31, 2019 | (Y = 200, Z = 300) |

If event E13g triggers a slit process (e.g., because the effective start and end dates cross over two or more production periods), it will be subjected to the same split process as described above. In aspects where a first event (e.g., event E1, in the above example) belongs to a first proposal (e.g., proposal P1) and a second event (e.g., event E3, in the above example) belongs to a second proposal (e.g., proposal P2), a clone and adjust process (e.g., cloneAdjustWET process) may be performed to adjust the returned WET so that it comprises all events that belong to one proposal, performs the collapse process, the split process, and the propogate process before looping in all WETs.

Figure 8:
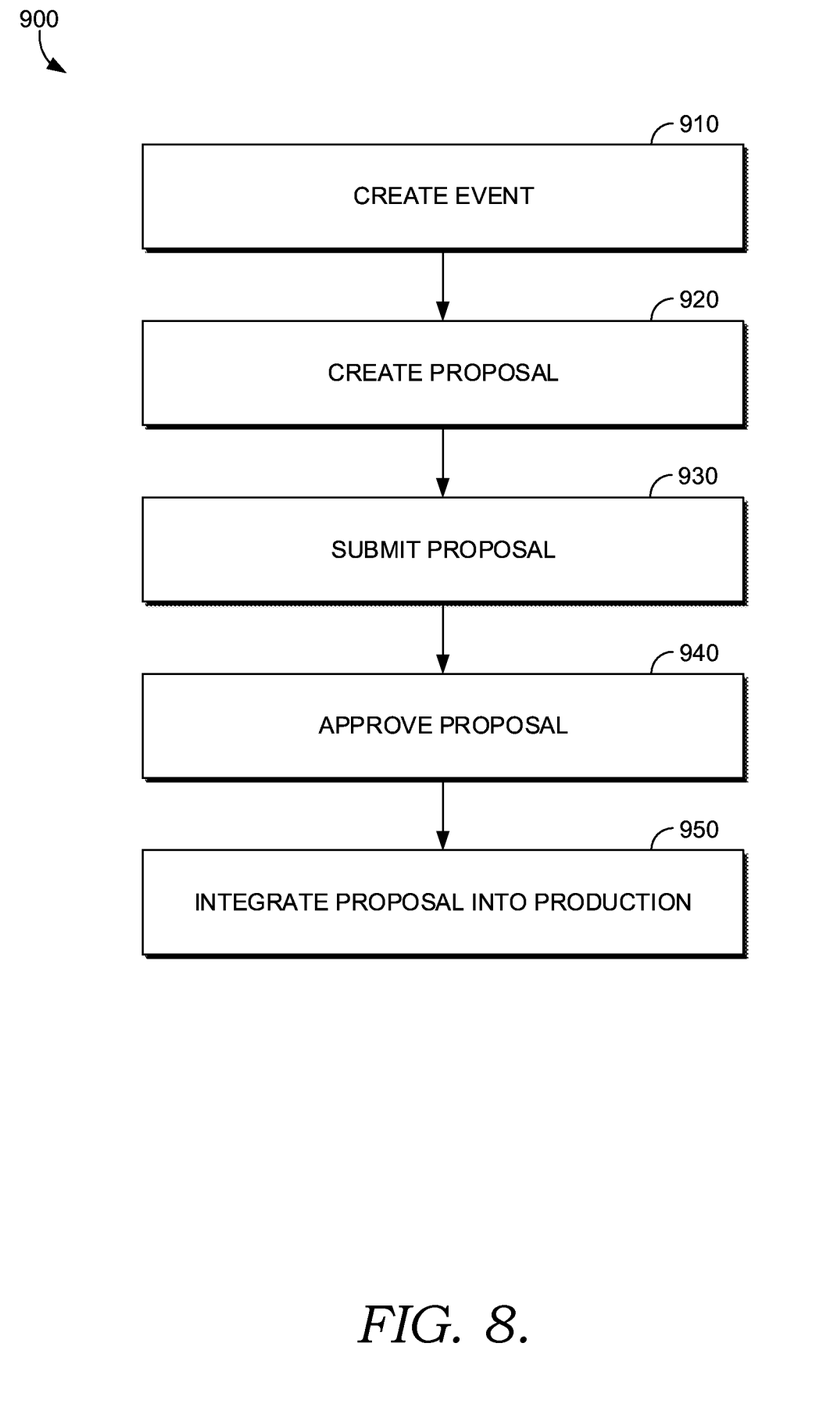
FIG. 8 shows a sequence diagram illustrating operations and processes that can be used in accordance with various embodiments of the present invention.

Turning now to FIG. 8, a sequence diagram is provided for a network planning process 900, according to the framework of the present disclosure. At step 910, an event is created having any one or more aspects of the event creation process 300 of FIG. 3. At step 920, a proposal is created wherein an indication is received from a network planner of one or more bundled events, each event of the one or more bundled events associated with one or more WETs and one or more changelog records. At step 930, the proposal is submitted having any one or more aspects of the proposal submission process 500 of FIG. 5. At step 940, a proposal is approved by an administrative user having any one or more aspects of the proposal approval process 700 of FIG. 7. At step 950, the proposal is integrated into production having any one or more aspects of the proposal integration process 800 of FIG. 8.

Embodiments described in the paragraphs above may be combined with one or more of the specifically described alternatives. In particular, an embodiment that is claimed may contain a reference, in the alternative, to more than one other embodiment. The embodiment that is claimed may specify a further limitation of the subject matter claimed.

The subject matter of embodiments of the invention is described with specificity herein to meet statutory requirements. However, the description itself is not intended to limit the scope of this patent. Rather, the inventors have contemplated that the claimed subject matter might also be embodied in other ways, to include different steps or combinations of steps similar to the ones described in this document, in conjunction with other present or future technologies. Moreover, although the terms "step" and/or "block" may be used herein to connote different elements of methods employed, the terms should not be interpreted as implying any particular order among or between various steps herein disclosed unless and except when the order of individual steps is explicitly described.

Throughout this disclosure, words such as "a" and "an," unless otherwise indicated to the contrary, include the plural as well as the singular. Thus, for example, the constraint of "a feature" is satisfied where one or more features are present. Also, the term "or" includes the conjunctive, the disjunctive, and both (a or b thus includes either a or b, as well as a and b).

Embodiments of the present invention have been described in relation to particular embodiments which are intended in all respects to be illustrative rather than restrictive. Alternative embodiments will become apparent to those of ordinary skill in the art to which the present invention pertains without departing from its scope.

From the foregoing, it will be seen that this invention is one well adapted to attain all the ends and objects hereinabove set forth together with other advantages which are obvious and which are inherent to the structure.

It will be understood that certain features and sub-combinations are of utility and may be employed without reference to other features or sub-combinations. This is contemplated by and is within the scope of the claims. The described technology may be made without departing from the scope, it is to be understood that all matter described herein or illustrated in the accompanying drawings is to be interpreted as illustrative and not in a limiting sense.

What is claimed is:

1. A method comprising:
communicating access to a plan document to each of a first client device, a second client device, and a third client device;
receiving, by a computing entity and from the first client device, a first indication comprising a first change to an object of the plan document;
responsive to receiving the first indication, appending, by the computing entity and without modifying the plan document, a first event to a single weighted event tree associated with the object, wherein the first event represents the first change to the object;
receiving, by the computing entity and from the second client device, a second indication comprising a second change to the object of the plan document;
responsive to receiving the second indication, appending, by the computing entity and without modifying the plan document, a second event to the single weighted event tree associated with the object, wherein the second event represents the second change to the object;
receiving, by the computing entity and from the third client device, a request to view the plan document; and
responsive to receiving the request, communicating, by the computing entity and to the third client device, access to the single weighted event tree along with access to the plan document previously communicated to the third client device, wherein the single weighted event tree comprises a listing of events associated with the object that comprises the first event and the second event, other events found in the listing of events besides the first event and the second event represent other changes to the object, and each event of the listing of events comprises a status indicating whether the corresponding event is enabled or disabled.

2. The method of claim 1, wherein the first change comprises modifying the object by updating a value for an attribute of the object to an updated value, and the method further comprises:
generating, by the computing entity, a construct map for the first event, wherein the construct map comprises a status indicator that the attribute for the object has been updated; and
generating, by the computing entity, a destruct map for the first event, wherein the destruct map comprises the updated value for the attribute.

3. The method of claim 1, wherein the first change comprises adding an attribute to the object, and the method further comprises:
generating, by the computing entity, a construct map for the first event, wherein the construct map comprises a status indicator that the attribute has been added to the object; and
generating, by the computing entity, a destruct map for the first event, wherein the destruct map comprises a value for the attribute.

4. The method of claim 1, wherein the first change comprises enabling the object for the plan document, and the method further comprises:
generating, by the computing entity, a construct map for the first event, wherein the construct map comprises a status indicator that the object has been enabled; and
generating, by the computing entity, a destruct map for the first event, wherein the destruct map comprises a value for an attribute of the object.

5. The method of claim 1, wherein the second change comprises disabling the object for the plan document, and the method further comprises generating, by the computing entity, a construct map for the first event, wherein the construct map comprises a status indicator that the object has been disabled.

6. The method of claim 1, wherein the second change comprises removing an attribute from the object, and the method further comprises:
generating, by the computing entity, a construct map for the second event, wherein the construct map comprises a status indicator that the attribute has been removed from the object; and
generating, by the computing entity, a destruct map for the first event, wherein the destruct map comprises a null value for the attribute.

7. The method of claim 1, wherein further to receiving the first indication, the method comprises:
submitting, by the computing entity, the first change to an administrative client device;
receiving, by the computing entity and from the administrative client device, an approval for the first change; and
responsive to receiving the approval, appending the first event to the single weighted event tree.

8. A system comprising:
a non-transitory computer-readable medium storing instructions; and
a computer processing component communicatively coupled to the non-transitory computer-readable medium, wherein the computer processing component is configured to execute the instructions and thereby perform operations comprising:
communicating access to a plan document to each of a first client device, a second client device, and a third client device;
receiving, from at least one of the first client device or the second client device, a first indication comprising a first change to an object of the plan document;
appending, without modifying the plan document, a first event to a single weighted event tree associated with the object, wherein the first event represents the first change to the object;
receiving, from at least one of the first client device or the second client device, a second indication comprising a second change to the object of the plan document;
appending, without modifying the plan document, a second event to the single weighted event tree associated with the object, wherein the second event represents the second change to the object;
receiving, from the third client device, a request to view the plan document; and
responsive to receiving the request, communicating, to the third client device, access to the single weighted event tree along with access to the plan document previously communicated to the third client device, wherein the single weighted event tree comprises a listing of events associated with the object that comprises the first event and the second event, other events found in the listing of events besides the first event and the second event represent other changes to the object, and each event of the listing of events comprises a status indicating whether the corresponding event is enabled or disabled.

9. The system of claim 8, wherein the first change comprises modifying the object by updating a value for an attribute of the object to an updated value, and the operations further comprise:
   generating a construct map for the first event, wherein the construct map comprises a status indicator that the attribute for the object has been updated; and
   generating a destruct map for the first event, wherein the destruct map comprises the updated value for the attribute.

10. The system of claim 8, wherein the first change comprises adding an attribute to the object, and the operations further comprise:
   generating a construct map for the first event, wherein the construct map comprises a status indicator that the attribute has been added to the object; and
   generating a destruct map for the first event, wherein the destruct map comprises a value for the attribute.

11. The system of claim 8, wherein the first change comprises enabling the object for the plan document, and the operations further comprise:
   generating a construct map for the first event, wherein the construct map comprises a status indicator that the object has been enabled; and
   generating a destruct map for the first event, wherein the destruct map comprises a value for an attribute of the object.

12. The system of claim 8, wherein the second change comprises disabling the object for the plan document, and the operations further comprise generating a construct map for the first event, wherein the construct map comprises a status indicator that the object has been disabled.

13. The system of claim 8, wherein the second change comprises removing an attribute from the object, and the operations further comprise:
   generating a construct map for the second event, wherein the construct map comprises a status indicator that the attribute has been removed from the object; and
   generating a destruct map for the first event, wherein the destruct map comprises a null value for the attribute.

14. The system of claim 8, wherein further to receiving the first indication, the operations comprise:
   submitting the first change to an administrative client device;
   receiving, from the administrative client device, an approval for the first change; and
   responsive to receiving the approval, appending the first event to the single weighted event tree.

15. A non-transitory computer-readable medium storing computer-executable instructions that, when executed by computing hardware, configure the computing hardware to perform operations comprising:
   communicating access to a plan document to each of a first client device, a second client device, and a third client device;
   receiving, from at least one of the first client device or the second client device, a first indication comprising a first change to an object of the plan document;
   appending, without modifying the plan document, a first event to a single weighted event tree associated with the object, wherein the first event represents the first change to the object;
   receiving, from at least one of the first client device or the second client device, a second indication comprising a second change to the object of the plan document;
   appending, without modifying the plan document, a second event to the single weighted event tree associated with the object, wherein the second event represents the second change to the object;
   receiving, from the third client device, a request to view the plan document; and
   responsive to receiving the request, communicating, to the third client device, access to the single weighted event tree along with access to the plan document previously communicated to the third client device, wherein the single weighted event tree comprises a listing of events associated with the object that comprises the first event and the second event, other events found in the listing of events besides the first event and the second event represent other changes to the object, and each event of the listing of events comprises a status indicating whether the corresponding event is enabled or disabled.

16. The non-transitory computer-readable medium of claim 15, wherein the first change comprises modifying the object by updating a value for an attribute of the object to an updated value, and the operations further comprise generating a construct map for the first event that comprises a status indicator that the attribute for the object has been updated.

17. The non-transitory computer-readable medium of claim 15, wherein the first change comprises adding an attribute to the object, and the operations further comprise generating a construct map for the first event that comprises a status indicator that the attribute has been added to the object.

18. The non-transitory computer-readable medium of claim 15, wherein the first change comprises enabling the object for the plan document, and the operations further comprise generating a construct map for the first event that comprises a status indicator that the object has been enabled.

19. The bon-transitory computer-readable medium of claim 15, wherein the second change comprises disabling the object for the plan document, and the operations further comprise generating a construct map for the first event that comprises a status indicator that the object has been disabled.

20. The non-transitory computer-readable medium of claim 15, wherein the second change comprises removing an attribute from the object, and the operations further comprise generating a construct map for the second event that comprises a status indicator that the attribute has been removed from the object.

* * * * *